May 5, 1964    M. C. STEBBINS    3,131,668
ALARM DEVICE
Filed April 5, 1962    2 Sheets-Sheet 1

INVENTOR.
MARK C. STEBBINS
BY
Barnes, Kisselle, Raisch & Choate
ATTORNEYS

May 5, 1964 M. C. STEBBINS 3,131,668
ALARM DEVICE
Filed April 5, 1962 2 Sheets-Sheet 2
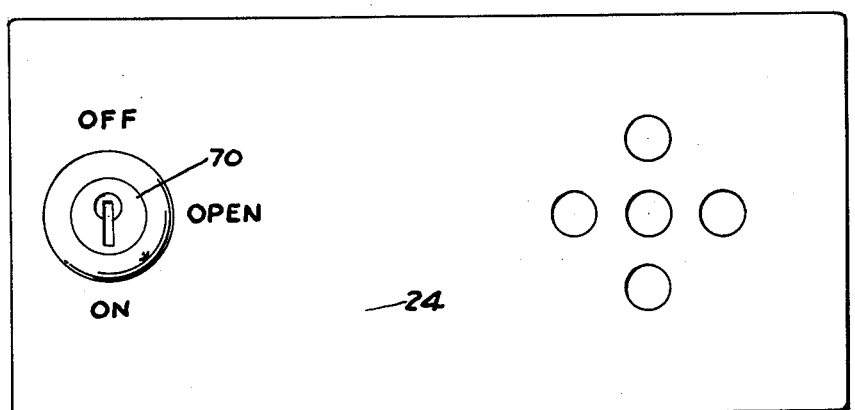
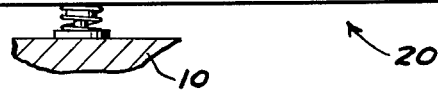
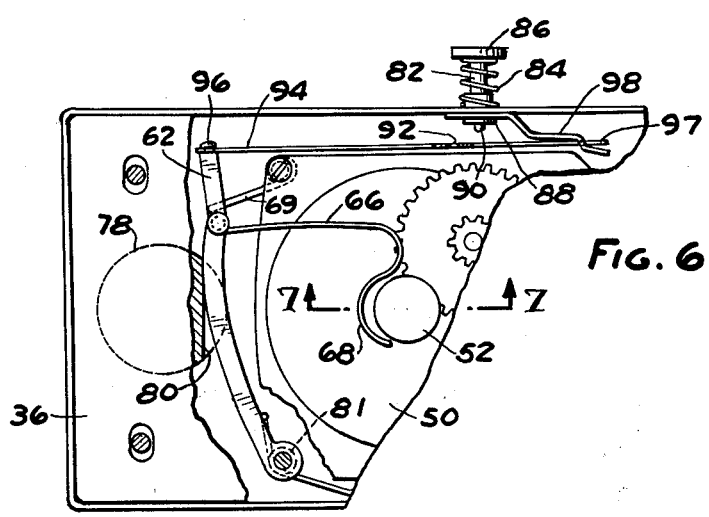
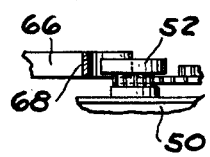
INVENTOR.
MARK C. STEBBINS
BY
Barnes, Kisselle, Raisch & Choate
ATTORNEYS

United States Patent Office 3,131,668
Patented May 5, 1964

3,131,668
ALARM DEVICE
Mark C. Stebbins, Detroit, Mich., assignor to Mark C. Stebbins and Sons, Inc., Detroit, Mich., a corporation of Michigan
Filed Apr. 5, 1962, Ser. No. 185,475
6 Claims. (Cl. 116—91)

This invention relates generally to a device which is mountable in a doorway, window opening, or the like to sound an alarm in the event that the door or window is opened by an unauthorized person. The device can be adapted for mounting either on a movable object such as a door or a stationary object such as a door frame. The latter arrangement is selected for illustration of the invention.

Devices of this nature have been used before. See for example my co-pending application Serial No. 15,945 filed March 18, 1950, now U.S. Patent No. 3,038,436, entitled "Alarm Device." The object of this invention is to provide a relatively simple, inexpensive, improved structure which can be set or reset conveniently by the mere act of placing the device in its operative position without the necessity of manipulating triggering devices or the like.

The invention generally contemplates an arm pivotally mounted on the alarm housing and carrying a brake element to and from braking engagement with a movable part of the alarm. A key operated lock is provided for locking the device in place and turning the device to On and Off positions in which the device remains locked in place. The lock has a tailpiece which, in the Off position, holds the brake arm in brake-On position, and in the On position frees the brake arm. A second restraint for the brake arm is provided by a plunger and a link interconnecting the plunger and brake arm. When the plunger retracts responsive to opening of the door, the link is freed and the alarm goes off. The alarm is set or reset merely by turning the lock to Off or open position and mounting the housing in place. One form of the invention is illustrated in the accompanying drawings.

FIG. 5 is an enlarged front face view of the alarm device looking upwardly as FIG. 1 is viewed.

FIG. 6 is a rear view of the device with parts broken away and showing the alarm in actuated condition.

FIG. 7 is a detailed view illustrating the relation between the brake element and shaft on the alarm device.

Figure 1:
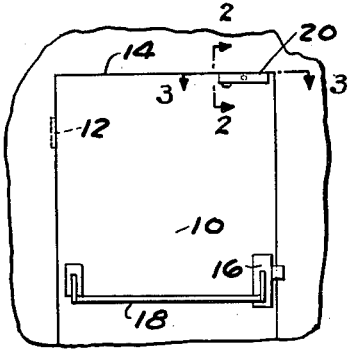
FIG. 1 is a partly diagrammatic elevational view illustrating an alarm device according to this invention mounted in a doorway.

Shown in FIG. 1 is a door 10 hinged at 12 for swinging within a doorway 14 and having a conventional latch 16 operated by depressing a conventional panic bar 18. An alarm device 20 according to this invention is mounted on the top member 22 of the doorway.

The alarm device has a housing 24 with a front wall 26, side walls 28 and 30 and end walls 32 and 34. The back wall 36 of the housing comprises an anchor plate secured to the upper doorway member 22 by such means as screws 38. Adjacent one end of plate 36 is an offset finger 40 defining a slot 42 for receiving a flange 44 turned inwardly from end wall 34. Adjacent the opposite end of plate 36 is a stud 46 having a pair of laterally projecting bayonet lugs 48.

Mounted within housing 24 is an alarm transmitting device which includes a siren, bell, or the like generally represented at 50 and having a shaft end 52 exposed within the housing. The siren is operated by a conventional spring motor 54 through interposed gearing as shown. The spring motor has a shaft slot at 56 for receiving a key for winding up the spring. The key 53 is shown as being stored within the housing beneath a retaining spring 60.

An arm 62 is pivotally mounted within the housing at 64 and carries a brake element 66 conveniently formed as a piece of spring metal and having an arcuate portion 68 shaped complementally to shaft end 52 to provide a brake for frictionally restraining operation of siren 50. A stationary shoulder 69 is provided for supporting arm 62.

A key operated lock 70 is provided for releasably locking housing 26 in place and for selectively turning the alarm to an On position and an Off position. This lock has a tailpiece 72 rotatable within the housing. The tailpiece has a hollow interior for receiving stud 46. The tailpiece has two axial bayonet slots 74 for receiving bayonet lugs 48 and these slots open into a re-entrant circumferential groove 76 in the tailpiece interior.

The tailpiece has a cylindrical exterior surface 78 with a relieved portion 80 aligned with arm 62 in one rotational position of the tailpiece. A torsional spring 81 urges arm 62 against the tailpiece.

A plunger 82 passes slidably through an opening in housing wall 28, and this plunger is biased outwardly by a coil spring 84 compressed between the housing exterior and a head 86 at the end of the plunger. The plunger has a retaining flange 88 which limits outward movement thereof. The inner end 90 of the plunger projects beyond flange 88 for engagement within an opening 92 in a link 94 loosely secured to the end of arm 62 by a headed pin 96 or the like. The opposite end 97 of link 94 is supported by a bracket 98 secured to the housing interior and having an offset apertured portion 100 through which the end of the link slidably projects. Link 94 is preferably made of a resiliently flexible metal strip to yield to extreme inward movement of flange 88.

In operation it may be assumed that motor 54 has been wound up and that anchor plate 36 has been secured to the upper member 22 of a doorway as described. Lock 70 has been key operated to open position so that its bayonet slots 74 are about 90° rotated from the position of FIG. 3. To mount the device in the doorway, flange 44 is hooked into slot 42 and end wall 32 of the housing is swung upwardly toward the top of the doorway. Bayonet lugs 48 enter slots 74 and stud 46 enters the hollow interior of the tailpiece. Lock 70 may be now turned to either the alarm Off position or the alarm On position, and in either event slots 74 are rotated out of alignment with lugs 48 which enter circumferential groove 76 in the tailpiece. The device is now firmly locked in place in the doorway.

If the lock is turned to the alarm Off position, the cylindrical exterior portion 78 of the tailpiece remains in engagement with arm 62 and obstructs any counterclockwise swinging of the arm which would release brake element 68 from siren shaft end 52. In this relation of the parts, the position of plunger 82 is immaterial. If it is in its outward position of FIG. 6 in which its inner end 90 is disengaged from link hole 92, the tailpiece still obstructs brake releasing movement of arm 62. Nevertheless, hole 92 remains aligned with plunger end 90 so that the plunger end can freely move in and out of it incidental to opening and closing movements of door 10.

Figure 2:
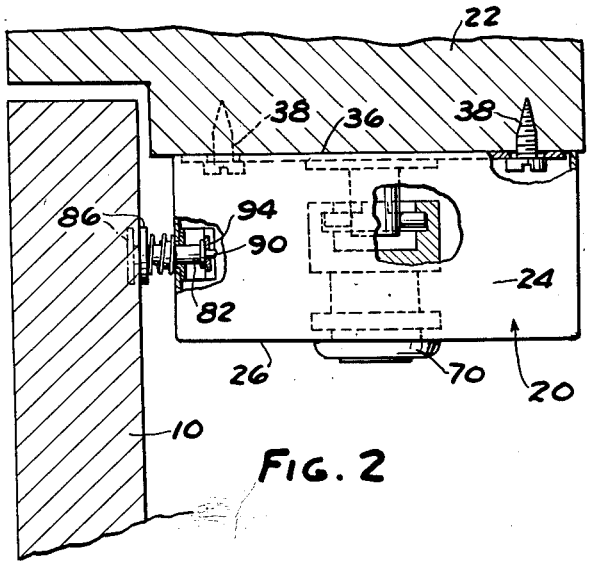
FIG. 2 is an enlarged view on line 2—2 of FIG. 1 with parts broken away to illustrate structure.
Figure 3:
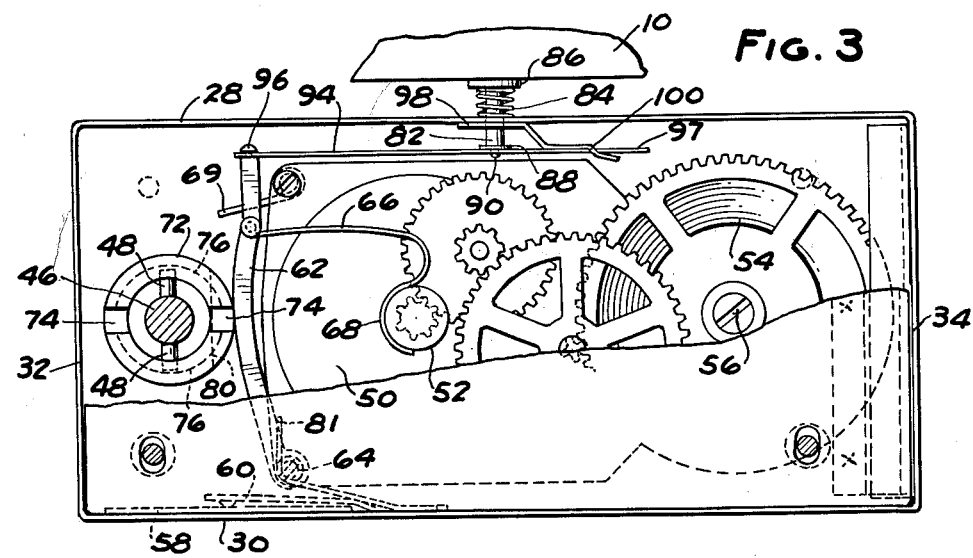
FIG. 3 is an enlarged view on line 3—3 of FIG. 1 with parts broken away to illustrate structure.
Figure 4:
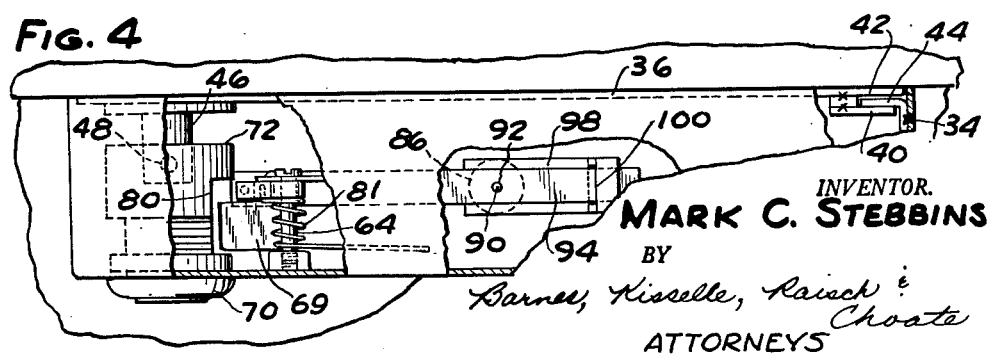
FIG. 4 is a side elevational view of the alarm device with parts broken away to illustrate structure.

If it is desired to set the alarm at its On position, door 10 is first closed so that plunger 82 is depressed inwardly and its end 90 projects through link opening 92. Lock 70 is then operated to the On position which rotates relieved portion 80 of the tailpiece into apposition with arm 62. However, the arm is restrained against brake releasing movement by cooperation of link 94 and plunger end 90. This position of the parts is illustrated in FIGS. 2, 3, and 4.

Subsequently, if the door should be opened, it will swing away from plunger head 86 permitting the plunger to shift outwardly under the action of spring 84 thereby retracting plunger end 90 from opening 92. This releases link 94 and in turn releases arm 62 for swinging in a counterclockwise direction under the action of spring 81. Brake element 68 is thereby disengaged from siren shaft end 52 so that the alarm is freed for operation. The alarm cannot be turned off except by an authorized person having a key with which to operate lock 70 to remove the housing from its mount.

To turn off the siren after it has been started, it is necessary to key operate lock 70 either to Off or open position so that tailpiece 72 rocks arm 62 clockwise thereby re-engaging brake element 68 against siren shaft end 52.

To remove the device from its mount, the lock is operated to open position thereby rotating slots 74 into alignment with bayonet lugs 48 so that end wall 32 of the housing can be moved away from anchor plate 36. Anchor flange 44 is then disengaged to the right as FIG. 4 is viewed from slot 42 to completely remove the device from its mount. The spring motor can then be rewound and the device reinstalled in the manner described. It is to be noted that the device is set or reset by the acts of winding, turning the key, and repositioning the housing on the door. No manipulation of triggering devices or the like is required.

I claim:

1. An alarm device comprising, an alarm transmitting mechanism in a housing adapted to be mounted in a doorway or the like, lock means releasably locking said housing in place and in locked condition being operable selectively to On and Off positions, means providing a movable member in said housing carrying a brake element engaged with a movable part of said mechanism and being spring biased toward brake released condition, said lock means including means operative in said Off position to provide first restraint against brake releasing movement of said member and being operative in said On position to free said member of said first restraint, means providing a plunger extending to the interior and exterior of said housing and being operable through interposed link means to provide second restraint against brake releasing movement of said member independently of said first restraint, said plunger being operatively releasable from said link means responsive to movement thereof relative to said housing induced by relative movement of said housing and an adjacent exterior object engaged by said plunger whereby to free said member of said second restraint and actuate said alarm transmitting device.

2. An alarm device comprising, an alarm transmitting device in a housing adapted to be mounted in a doorway or the like, lock means releasably locking said housing in place and in locked condition being operable selectively to On and Off positions, an arm mounted for swinging movement in said housing, said arm carrying a brake element engaged with a movable part of said mechanism, said arm being spring biased toward brake releasing movement, said lock means including means operative in said Off position to provide first restraint against said brake releasing movement and being operative in said On position to free said arm of said first restraint, a plunger extending to the interior and exterior of said housing, a link interposed between said plunger and arm to provide second restraint against said brake releasing movement independently of said first restraint, said plunger being operably releasable from said link responsive to movement thereof relative to said housing induced by relative movement of said housing and an adjacent external object engaged by said plunger whereby to free said arm of said second restraint and actuate said alarm transmitting device.

3. An alarm device comprising, an alarm transmitting device in a housing adapted to be mounted in a doorway or the like, lock means releasably locking said housing in place and in locked condition being operable selectively to On and Off positions, an arm pivoted in said housing and carrying a brake element engaged with a movable part of said mechanism, said arm being spring biased for movement in a direction for releasing said brake element from said movable part, said lock means including means operative in said Off position to provide first restraint against brake releasing movement of said arm and being operative in said On position to free said arm of said first restraint, a plunger extending to the interior and exterior of said housing, a link having one portion connected to said arm and another portion detachably connected to said plunger, said link and plunger in connected relation cooperating to provide second restraint against brake releasing movement of said arm independently of said first restraint, said plunger being detachable from said link responsive to movement thereof relative to said housing induced by relative movement of said housing and an adjacent exterior object engaged by said plunger whereby to free said link for movement and facilitate brake releasing movement of said arm for actuating said alarm transmitting device.

4. An alarm device comprising, an alarm transmitting device in a housing adapted to be mounted in a doorway or the like, lock means releasably locking said housing in place and in locked condition being operable selectively to On and Off positions, a movable member in said housing carrying a brake element engaged with a movable part of said mechanism and being spring biased toward brake released condition, said lock including means operative in said Off position to provide first restraint against brake releasing movement of said member and being operative in said On position to free said member of said first restraint, a plunger extending to the interior and exterior of said housing, means including a link operably interposed between said plunger and member to provide second restraint against brake releasing movement of said member independently of said first restraint, said plunger being spring biased outwardly and having means forming a retaining flange limiting outward movement of said plunger, said link having an opening which receives said plunger to form the operative connection therebetween at an intermediate axial position of said plunger, said link being resiliently flexible so that it yields resiliently to engagement by said retaining flange upon extreme inward movement of said plunger, said plunger being retractable from said opening to release said link responsive to spring induced relative movement of said plunger and housing as a result of relative movement of said housing and an adjacent external object engaged by said plunger whereby to free said member of said second restraint and actuate said alarm transmitting device.

5. An alarm device comprising, an alarm transmitting device in a housing adapted to be mounted in a doorway or the like, lock means releasably locking said housing in place and in locked condition being operable selectively to On and Off positions, an arm having one end portion pivotally mounted in said housing and having a free end portion, a brake element carried by said arm for braking engagement and disengagement with a movable part of said mechanism, said arm being spring biased toward brake releasing movement of said arm, said lock means including means operative in said Off position to provide an obstruction to brake releasing movement of said arm and being operative in said On position to free said arm of said obstruction, a plunger extending to the interior and exterior of said housing and being spring biased outwardly for engagement against an external object, a link having one portion with an opening therein for receiving said plunger and having another portion connected to said free end of said arm, said link forming a tie restraining brake releasing movement of said arm independently of the restraint of said obstruction when said plunger is engaged in said opening, said link being releasable responsive to retraction of said plunger from said opening upon spring biased outward movement of said plunger resulting from relative movement of said housing and an adjacent external object engaged by said plunger whereby to free said arm for brake releasing movement and to actuate said alarm transmitting device.

6. An alarm device comprising, an alarm transmitting mechanism in a housing adapted to be mounted on a doorway or the like, a lock having a tailpiece within said housing, said tailpiece having a hollow interior with reentrant recessed portions releasably engageable with anchor means for securing said housing in place, said tailpiece having first and second exterior portions, means providing a movable member in said housing carrying a brake element engaged with a movable part of said mechanism and being spring biased toward brake released condition, said first and second tailpiece exterior portions being rotatable respectively into apposition to said movable member in Off and On positions while said internal portions remain in locked condition, said first exterior portion providing an obstruction to brake releasing movement of said movable member, said second exterior portion being relieved to free said movable member for brake releasing movement, a plunger extending to the interior and exterior of said housing and being operable through interposed link means to provide restraint against brake releasing movement of said member independently of the position of said tailpiece, said plunger being operatively releasable from said link means responsive to movement thereof relative to said housing incidental to relative movement of said housing and an adjacent object engaged by said plunger whereby to free said member of said restraint and actuate said alarm transmitting device.

References Cited in the file of this patent
UNITED STATES PATENTS

| | | |
|---|---|---|
| 1,177,121 | Markowicz | Mar. 28, 1916 |
| 3,038,436 | Stebbins | June 12, 1962 |